US012674925B2

(12) United States Patent
Leonardis et al.

(10) Patent No.: US 12,674,925 B2
(45) Date of Patent: Jul. 7, 2026

(54) DEVICE AND METHOD FOR IMAGE PROCESSING

(71) Applicant: HUAWEI TECHNOLOGIES CO., LTD., Shenzhen (CN)

(72) Inventors: Ales Leonardis, London (GB); Yannick Verdie, Toronto (CA); Benjamin Busam, London (GB); Steven George Mcdonagh, London (GB); Barnabé Mas, Oxford (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 445 days.

(21) Appl. No.: 18/311,086

(22) Filed: May 2, 2023

(65) Prior Publication Data

US 2023/0273357 A1 Aug. 31, 2023

Related U.S. Application Data

(63) Continuation of application No. PCT/EP2020/081385, filed on Nov. 6, 2020.

(51) Int. Cl.
  *G02B 5/30*      (2006.01)
  *G06T 7/50*      (2017.01)
      (Continued)
(52) U.S. Cl.
  CPC .................. *G02B 5/30* (2013.01); *G06T 7/50* (2017.01); *G06V 10/761* (2022.01); *G06V 10/82* (2022.01)

(58) Field of Classification Search
  CPC ..... G06T 7/11; G06T 7/50; G06T 7/60; G06T 7/521; G06T 7/593; G06T 2207/00;
      (Continued)

(56) References Cited

U.S. PATENT DOCUMENTS 9,626,767 B2    4/2017  Ida et al.
11,410,378 B1 *  8/2022  Ghosh ....................... G06T 7/90
      (Continued)

FOREIGN PATENT DOCUMENTS

CN    102356628 B    3/2015
JP     4317583 B2    8/2009

OTHER PUBLICATIONS

Ozyesil et al., "A survey of structure from motion," arXiv preprint (2017), May 9, 2017; 40 total pages.
      (Continued)

*Primary Examiner* — Sultan Chowdhury
(74) *Attorney, Agent, or Firm* — Rimon PC

(57) ABSTRACT

An image processing apparatus for estimating a depth field over a field of view. The apparatus comprises one or more processors configured to receive a captured polarisation image representing a polarisation of light received at a first set of multiple locations over the field of view; process the captured polarisation image using a first trained neural network to form a first estimate of depths to one or more locations over the field of view; receive ranging data representing environmental distances from a datum to one or more locations over the field of view; and process the ranging data using a second trained neural network to form a second estimate of depths to a second set of multiple locations over the field of view.

20 Claims, 3 Drawing Sheets

(51) Int. Cl.
G06V 10/74 (2022.01)
G06V 10/82 (2022.01)

(58) Field of Classification Search
CPC ....... G06T 2207/10; G06T 2207/10008; G06T
2207/10028; G06T 2207/20081; G06T
2207/20084; G06V 10/24; G06V 10/74;
G06V 10/82; G06V 10/147; G06V
10/454; G06V 10/761; G06V 10/7715
See application file for complete search history.

(56) References Cited

U.S. PATENT DOCUMENTS

| | | | |
|---|---|---|---|
| 2015/0248764 A1* | 9/2015 | Keskin | G06V 20/64 |
| | | | 382/106 |
| 2016/0261844 A1 | 9/2016 | Kadambi et al. | |
| 2019/0295282 A1* | 9/2019 | Smolyanskiy | G01S 13/867 |
| 2021/0049203 A1* | 2/2021 | Gupta | G06F 40/205 |
| 2022/0343537 A1* | 10/2022 | Taamazyan | G06V 10/82 |

OTHER PUBLICATIONS

Daniel Scharstein et al., "A taxonomy and evaluation of dense two-frame stereo correspondence algorithms," International Journal of Computer Vision 47.1-3 (2002), Mar. 25, 2022; 35 total pages.

Zbontar et al., "Stereo Matching by Training a Convolutional Neural Network to Compare Image Patches," The journal of Machine Learning Research, 17(1), May 18, 2016; 32 total pages.

Sameh Khamis et al., "Stereonet: Guided Hierarchical Refinement for Real-Time Edge-Aware Depth Prediction," In Proceedings of the European Conference on Computer Vision (ECCV), Jul. 25, 2018; 18 total pages.

Godard, C. et al., "Unsupervised monocular depth estimation with left-right consistency," In Proceedings of the IEEE Conference on Computer Vision and Pattern Recognition, Apr. 13, 2017; 14 total pages.

Godard C. et al., "Digging Into Self-Supervised Monocular Depth Estimation," In Proceedings of the IEEE International Conference on Computer Vision 2019, Aug. 17, 2019; 18 total pages.

Yinda Zhang et al., "ActivestereoNet: End-to-End Self-Supervised Learning for Active Stereo Systems," In Proceedings of the European Conference on Computer Vision (ECCV), Jul. 18, 2018; 9 total pages.

Dizhong Zhu et al., "Depth from a polarisation + RGB stereo pair," DOI: 10.48550/arXiv.1903.12061, Mar. 2019; 11 total pages.

Achuta Kadambi et al., "Polarized 3D: High-Quality Depth Sensing with Polarization Cues," ICCV 2015; 9 total pages.

Zhaopeng Cuii et al., "Polarimetric Multi-View Stereo," CVPR 2017, Mar. 26, 2017; 11 total pages.

Yunhao Ba et al., "Deep Shape from Polarization," arXiv 2020, May 25, 2020; 11 total pages.

* cited by examiner

Point-wise distance error

Surface orientation error

DEVICE AND METHOD FOR IMAGE PROCESSING

CROSS-REFERENCE TO RELATED APPLICATIONS

This disclosure is a continuation of International Application No. PCT/EP2020/081385, filed on Nov. 6, 2020. The disclosures of the aforementioned application are hereby incorporated by reference in their entirety.

TECHNICAL FIELD

This disclosure generally relates to estimating depth in a scene. The scene may be represented in a visual image. The process of estimating depth may be implemented by using data from a visual image and additional data representing depth at least in some locations in the scene. The scene may fall in the fields of view of one or more sensors.

BACKGROUND

A large body of work has been done in the field of computer vision to develop systems capable of estimating depths of locations in a visual image. For example, by recognizing features in an image, a suitably trained neural network can estimate the distance from a datum (e.g., the location of the camera that captured the image) to the location of an item depicted in a location in the image. Another field of research has been directed to sensor devices for directly estimating depth, for example by emitting a signal in a selected direction and estimating the time taken for that signal to return. Each approach relies on some known information in order to extrapolate depth information. The quantity that is known is what differentiates the various sensor device approaches. Examples of known information include the spatial distance between pairs of sensors (e.g., stereo), a known light pattern (e.g., coded or structured light) and the speed of light (light detection and ranging (LiDAR), time-of-flight measurement). In each case, the known variable is used in order to estimate depth, for example to estimate the depth of the distances to locations in an image for which no depth data is known a priori.

A common way to subdivide depth estimation methods is to distinguish between so-called passive methods and so-called active methods. Passive methods typically retrieve depth information from visible spectrum images and consider two-view images (e.g., space, 'stereo') or multi-view images (e.g., 'stereo' or time, 'temporal') in order to perform image correspondence matching and triangulation/trilateration. Stereo depth cameras may be utilized which have two sensors spaced typically a small distance apart, and a system can compare two images from these sensors which image (e.g., capture) the same or at least overlapping fields of view. Since the distance between the sensors that capture the images is known, these comparisons can provide depth information.

An image from a single point of view allows the distance up to a line to be determined. With an image from a second point of view, the correct distance to other locations can be inferred by comparing the images content. The maximum distance that stereo setups can reliably measure is directly related to how far apart the two sensors are. The wider the baseline is, the further the system can infer distance with reliability. The distance error quadratically increases with an increase in distance. The field of stereo techniques has been well studied for several decades and is still an active area of research, however, inherent problems remain that hinder practical applications. These include the requirement of accurate image rectification (i.e., computationally arriving at co-planar and horizontally aligned image planes) and the ill-posed nature of performing correspondence matching in texture-less regions of the scene (e.g., regions of the image space).

Another form of depth estimation is to use time-of-flight. This is known as an active method. Light is projected into the scene and depth information can then be measured from the echoed signals. Time-of-flight (ToF) based techniques can be considered a recent approach in active depth sensing. ToF cameras determine depth information by measuring phase differences between the emitted light and the reflected light or the time required by the light for a round-trip from illumination source into the scene and back. ToF devices are typically faster than comparable laser range scanners and are cable of capturing depth information for dynamic scenes in real time. Indirect ToF measurements: where the illumination source and the receiving sensor are not spatially incident; are often relatively noisy and subject to low image resolutions (e.g., 200×200 pixels) in comparison to consumer and high-end visible spectrum, passive cameras (which may have a resolution of multiple megapixels). Depending on the power and wavelength of the light, time-of-flight sensors can measure depth at significant distances. LiDAR sensors make use of knowledge of the speed of light and are essentially time-of-flight cameras which use laser light to perform the depth calculation. Laser range scanner devices constitute the earliest active methods and typically achieve high accuracy. However the slice-by-slice nature of laser scanning makes them time-consuming and generally inapplicable for dynamic scenes. Similar to other ToF cameras, these devices emit a beam of light and sweep the beam over the scene in order to measure the amount of time it takes for the light to return to a sensor on the camera. One disadvantage of time of (low-power) flight cameras is that they are susceptible to other cameras in the same space and may function poorly in outdoor conditions. Strong performance in outdoor conditions requires much higher energy and yet only typically provides a sparse depth signal. If situations arise where the light registering on the sensor may not have been the light emitted from the specific related camera (e.g., from some other source such as the sun or another camera), this will be detrimental to the quality of resulting depth estimation. The most significant source of error in direct ToF is often attributed to MPI (multi-path interference), or in other words, cases where the light is emitted from the correct (e.g., original) source but is measured after multiple bounces from within the scene, heavily effecting the distance measurement.

A further category of active sensor is based on the principals of structured-light or coded-light. These rely on projecting light patterns, typically from a non-visible part of the spectrum (e.g., infrared), into the scene using a light emitter device. The projected pattern is either visual, temporal, or a combination of these. Since the projected light constitutes a pattern known to the device, the nature in which the camera sensor perceives the pattern in the scene provides depth information. Using the disparity between an expected image pattern and the actual image (as viewed by the camera) allows a calculation of distance to the camera sensor at every pixel (e.g., a dense 'depth map'). Structured-light sensors can now be considered a reasonably mature technology with commodity hardware available and a range of consumer devices on the market. The technology relies on accurately capturing light, projected into the scene, and therefore devices perform best when indoors at relatively short ranges (i.e., subject to the power of light emission). Performance may also suffer if there is additional noise in the environment from other cameras or devices emitting light in common parts of the spectrum (e.g. infrared). Depth maps generated by these sensors may also contain holes due to occlusions caused by the relative displacement between the light projection source and the (infrared) camera observing the light.

In addition to intensity, speed, and colour (i.e., wavelength), one further source of light information that has been less widely considered for the task of photometric recovery of depth is light polarisation (e.g., polarization). Light polarisation is affected by factors in a scene such as surface shape, surface curvature, surface material, and the position of objects with respect to light sources. Polarisation therefore provides an additional information signal about surface geometry and scene depth. In particular, polarisation imaging can be used for the shape determination of specular and transparent objects, where intensity and wavelength of reflections are less well defined (for example transparent objects will take on the colour of whatever is behind them). The base assumption is that the scene is illuminated by unpolarised light and therefore any polarisation detected can be assumed to be caused by reflection from surfaces. The related assumption is that observed objects have smooth reflective surfaces. By measuring the degree of polarisation of light incident to a camera, the direction of surface normals can be obtained and an acquisition of such surface normals at a sufficient number of points in the scene then allows for reconstruction of scene surfaces. The nature of the signal provided by polarisation cameras make for reliable information in terms of physical retrieval of surface normal orientations and can typically afford contrast enhancement and reflection removal. However, the modality is susceptible to surface point-wise absolute distance errors.

Active range sensors are often utilized in applications where estimation accuracy and robustness are of high importance (e.g., robotics and other autonomous systems). However many factors make it infeasible to rely solely on expensive active sensors in every scenario, namely due to scene geometry constraints, size, power (e.g., active illumination), heat dissipation, expected life/duration of passive vs. active element, etc. Contemporary learning-based approaches have been used in conjunction with many input modalities, however, reasonable performance can now be achieved by methods that rely solely on passive sensor input. Models typically consider Red-Green-Blue (RGB) images (e.g., monocular or stereo) as input and harness recent learning strategies. Recent work makes use of fully-supervised convolutional neural networks (CNNs) to infer depth from passive stereo image pairs (see Žbontar, J. and LeCun, Y., 2016. Stereo matching by training a convolutional neural network to compare image patches. The journal of machine learning research, 17(1), pp. 2287-2318 and Khamis, S., Fanello, S., Rhemann, C., Kowdle, A., Valentin, J. and Izadi, S., 2018. Stereonet: Guided hierarchical refinement for real-time edge-aware depth prediction. In Proceedings of the European Conference on Computer Vision (ECCV) (pp. 573-590)) or even monocular imagery (see Godard, C., Mac Aodha, O. and Brostow, G. J., 2017. Unsupervised monocular depth estimation with left-right consistency. In Proceedings of the IEEE Conference on Computer Vision and Pattern Recognition (pp. 270-279) and Godard C, Mac Aodha O, Firman M, Brostow G J. Digging into self-supervised monocular depth estimation. In Proceedings of the IEEE international conference on computer vision 2019

(pp. 3828-3838)) where prior knowledge and information about the structure of the world is encoded in (learned) model weights.

Prior work that combine visual modalities also exist. Recent stereo camera setups (as discussed previously) may also have an 'active' component and project infrared light into the scene, towards further improving depth estimation accuracy. In contrast with structured or coded light cameras, stereo cameras may use any part of the light spectrum to measure depth. Since these setups use any visual features to measure depth, they are capable of working in most lighting conditions, including outdoors. The addition of an infrared emitter allows such setups to also function in low light conditions as the camera is able to still perceive depth detail (see Zhang, Y., Khamis, S., Rhemann, C., Valentin, J., Kowdle, A., Tankovich, V., Schoenberg, M., Izadi, S., Funkhouser, T. and Fanello, S., 2018. Activestereonet: End-to-end self-supervised learning for active stereo systems. In Proceedings of the European Conference on Computer Vision (ECCV) (pp. 784-801)).

FIG. 1 illustrates point-wise distance error and surface orientation errors. Depth estimations are indicated by surfaces. The top row illustrates that point-wise distance error statistics can distinguish between distances to camera sensor (top right) and yet give little information with regard to distinguishing between differing surface normal orientations (top left). ToF sensors are sensitive to this type of depth estimation error. The bottom row illustrates that surface orientation error statistics (bottom left) allow distinguishing between normal direction differences, yet find it difficult to disambiguate camera sensor distance differences (bottom right). Polarisation sensors are more sensitive to this type of depth estimation error.

In summary, depth sensing is one of the fundamental challenges of computer vision. A large set of applications may be enabled by accurate scene depth estimation. A depth estimation device (and technique) that is robust, accurate, and real time would be a useful enabling component in these applications.

Existing approaches typically suffer from problems as follows. Laser scanners are too slow for real time use. Passive stereo are ineffective for texture-less scenes. Time-of-flight sensors provide real time independent estimates at each pixel, however, are typically low resolution, noisy, and poorly calibrated. Photometric stereo is prone to low frequency distortions and polarisation cues may struggle to obtain accurate absolute distances.

SUMMARY

According to one aspect of the disclosure, there is provided an image processing apparatus for estimating a depth field over a field of view. The apparatus comprises one or more processors configured to: receive a captured polarisation image representing a polarisation of light received at a first set of multiple locations over the field of view; process the captured polarisation image using a first trained neural network to form a first estimate of depths to one or more locations over the field of view; receive ranging data representing environmental distances from a datum to one or more locations over the field of view; process the ranging data using a second trained neural network to form a second estimate of depths to a second set of multiple locations over the field of view; form a synthetic polarisation image representing estimates of the polarisation of light received at a third set of multiple locations over the field of view by processing one or both of the first and second estimates of depths using a first analytic formulae; and form synthetic ranging data representing estimates of the environmental distances to one or more locations over the field of view by processing one or both of the first and second estimates of depths using a second analytic formulae.

The use of analytic formulae, as opposed to other approaches such as machine learning/neural network approaches to form the synthetic data can reduce the computational complexity of the respective tasks. This can make them more readily implemented on a small device.

Once the synthetic polarisation image and the synthetic ranging data have been formed, they may be compared respectively with the captured polarisation image and the received ranging data. That comparison, for a region of the image, may be used to select either the synthetic ranging data or the received ranging data as representing a depth estimate for that region of the image.

The first, second, and third sets of multiple locations may by the same or different. It is convenient if they all include a set of points or regions in common since then the data can be readily compared.

The polarisation image may represent the polarisation of light received for multiple locations over the field of view at one or more predetermined polarisations. This can allow a preferred depth estimate to be selected irrespective of the actual polarisation for light captured from a given part of the field of view.

The image processing apparatus may comprise an active sensor apparatus for forming the ranging data. The active sensor apparatus may comprise a time-of-flight sensor. The sensors may be co-located. They may be attached together so as to image (e.g., capture) the same or overlapping scenes. This can help to achieve commonality between the subject matter of the captured data.

The apparatus may be configured to form multiple synthetic polarisation images, the synthetic polarisation images being estimated by the first analytic formulae for a plurality of supposed reflectiveness properties. This can allow a preferred depth estimate to be selected irrespective of the actual polarisation for light captured from a given part of the field of view.

The supposed reflectiveness properties may comprise diffuseness and specularity. This can allow the behaviour of different surfaces to be modelled.

The apparatus may be configured to form multiple synthetic polarisation images, the synthetic polarisation images being estimated by the first analytic formulae for a plurality of supposed polarisations. This can allow the system to benefit from a camera that captures images at multiple polarisations.

The apparatus may be configured to form multiple synthetic polarisation images, the synthetic polarisation images being estimated by the first analytic formulae for a plurality of supposed colours. This can allow the system to accommodate different colours of reflected light in the captured image.

The step of comparing the polarisation image with the synthetic polarisation image may comprise reducing the multiple synthetic polarisation images to the synthetic polarisation image by selecting for each location in the field of view for which multiple of the synthetic polarisation images hold estimated polarisation information, the polarisation information for that location having the smallest estimated error. This can allow a preferred depth estimated to be selected.

The first analytic formulae may be such as to form the estimates of the distances to multiple locations over the field of view in dependence on the intensity of at least one polarisation image at the respective locations. This can assist in improving the distance estimates.

The second analytic formulae may be such as to form, for each of multiple locations over the field of view, multiple estimates of the distances to the respective location in dependence on respective phase offsets. This can allow a preferred one of such estimates to be selected.

The image processing apparatus may comprise a camera for capturing the captured polarisation image. Then an image captured by the camera may be enhanced in dependence on the computations described above.

The captured polarisation image may comprise stereoscopic polarisation images. This may assist in forming depth information.

The first and second neural networks may be the same. This can reduce computational complexity and memory requirements.

The first analytic formula may be such as to calculate polarisation estimates in dependence on a trigonometric function of an angle formed from a first sub-angle calculated in dependence on a normal to a corresponding surface and a second sub-angle representing a candidate polarisation angle. In this way, such a formula can apply a model of reflectance behaviour.

The second analytic formula may be such as to calculate distance estimates in dependence on a trigonometric function of an angle formed from a phase value calculated in dependence on a depth to a corresponding surface. In this way, such a formula can apply a model of reflectance behaviour.

According to a second aspect, there is provided a computer-implemented method for estimating a depth field over a field of view. The method comprises: receiving a captured polarisation image representing a polarisation of light received at a first set of multiple locations over the field of view; processing the captured polarisation image using a first trained neural network to form a first estimate of depths to one or more locations over the field of view; receiving ranging data representing distances from a datum to one or more environmental locations over the field of view; process the ranging data using a second trained neural network to form a second estimate of depths to a second set of multiple locations over the field of view; forming a synthetic polarisation image representing estimates of the polarisation of light received at a third set of multiple locations over the field of view by processing one or both of the first and second estimates of depths using a first analytic formulae; and forming synthetic ranging data representing estimates of the distances to one or more environmental locations over the field of view by processing one or both of the first and second estimates of depths using a second analytic formulae.

When multiple modalities are available to capture a common scene, strategies involving sensor fusion can be utilized towards improving depth estimation i.e. the combination of multiple, complementary signal sources for improvements to depth estimation accuracy.

BRIEF DESCRIPTION OF THE FIGURES

The present disclosure will now be described by way of example with reference to the accompanying drawings. In the drawings:

FIG. 3 shows a first schematic of a network architecture for depth estimation from polarisation correlation time-of-flight (ToF) input image modalities; and FIG. 4 shows a second schematic of a network architecture for depth estimation from polarisation correlation ToF input image modalities.

DETAILED DESCRIPTION

Figure 1:
FIG. 1 illustrates depth estimation techniques.
Figure 1:
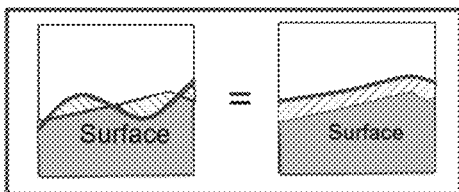
Figure 1:
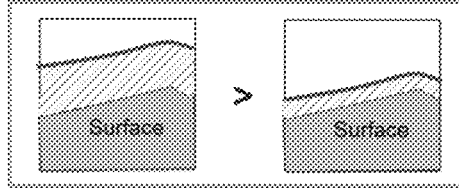
Figure 1:
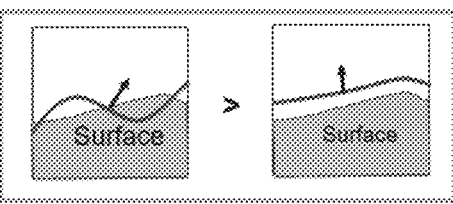
Figure 1:
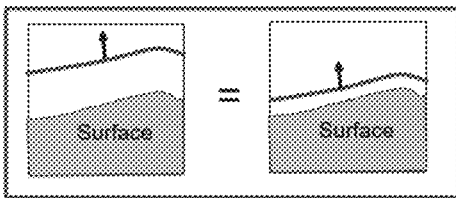
Figure 2:
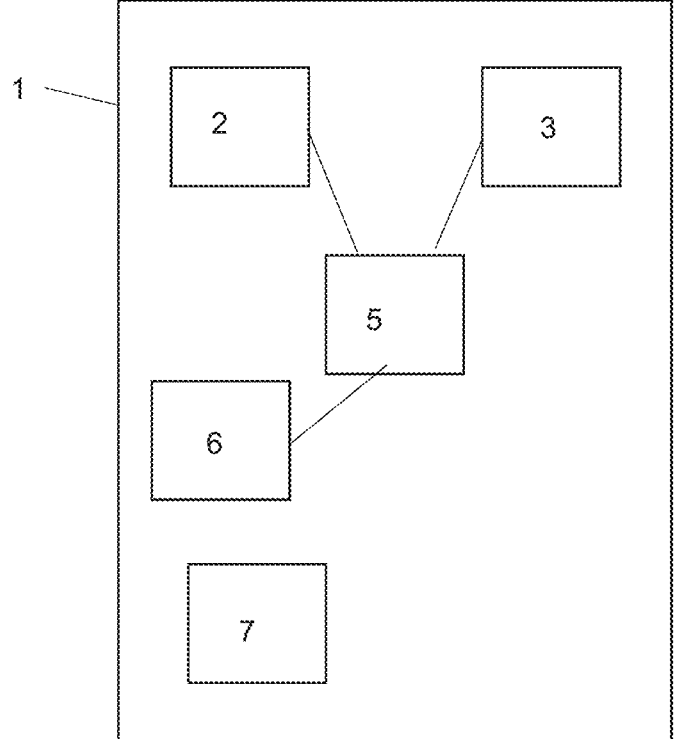
FIG. 2 is a schematic of a device for performing depth estimation.

FIG. 2 shows a device for implementing the present system. In this example the device is a mobile phone, but it could be any suitable device and/or functionality described could be divided between multiple separate devices.

The device of FIG. 2 comprises a housing 1 which holds (e.g., houses) the other components. A camera 2 and an active depth sensor 3 are attached (e.g., coupled) to the housing. The camera 2 and the sensor 3 are attached to the housing 1 in a way so that they image the same or at least overlapping fields of view. A processor 5 (there could be more than one processor) is communicatively coupled to the camera and the depth sensor to receive data from them. A memory 6 is coupled to the processor. The memory stores non-transient form code executable by the processor to perform the functions described herein. By having such a code available for execution, the processor is adapted from a general-purpose processor so as to perform those functions. The device of FIG. 2 is hand-portable and powered by a battery or another local energy storage 7.

The camera of 2 FIG. 2 may include an image sensor and, may optionally be configured to have some onboard processing capability. The active depth sensor may, for example be a time-of-flight (ToF) sensor. The ToF sensor may also include some onboard processing capability.

The device of FIG. 2 may have a transceiver 8 that is capable of communicating over a network with other entities. Those entities may be physically remote from the camera device of FIG. 2. The network may be a publicly accessible network such as the Internet. The other entities may be based in the cloud. These entities are logical entities. In practice they may each be provided by one or more physical devices such as servers and datastores, and the functions of two or more of the entities may be provided by a single physical device. Each physical device implementing such an entity comprises a processor and a memory. The devices may also each comprise a transceiver for transmitting and receiving data to and from the transceiver 8 of the device of FIG. 2. Each memory stores in a non-transient way code that is executable by the respective processor to implement the respective entity in a suitable manner.

Where processing is to be performed for the benefit of the device of FIG. 2, that processing may be done exclusively at that device, or it may be offloaded in whole or in part to the other entities described above.

The system to be described below can estimate scene depth from multiple visual information sources. A learning-based pipeline is capable of combining multiple information sources towards recovering scene depth estimations. It has been found that this architecture can provide improved accuracy over the case where estimations from conventional single modalities are used.

Depth information obtained from imagery can be intrinsically composed of information that indicates (1) surface orientations and (2) point-wise distances to the sensor that captured the image. The location of such a sensor at the time an image is captured may be considered a datum for the estimation of depths in the image. The approach to be described below fuses information from multiple modalities.

It is desirable to exploit individual sensor strengths and obtain consistent information from component parts.

In the present system, depth estimation is performed using a learning-based strategy involving self-supervised consistency data from multiple modalities. The system combines information from multiple image modalities. In the example to be described below those modalities are (1) directly measured depth data from an indirect time-of-flight (I-ToF) sensor and (2) polarisation data derived from a visual image. The framework to be described below can learn (or be provided with a learned) model for depth estimation. The learning for such a model may be based on the concept that input signals represent a consistent external world and must therefore be consistent between image modalities. Thus, if the depth values for a part of the image, for instance, are all the same, they represent a plane and surface normals extracted in this area need to be similar. This has been found to result in a method capable of estimating depth that is trained using multiple image sources, but yet requiring only a single modality at an inference time.

An end-to-end pipeline for this purpose is trainable without the need for ground-truth annotation labels by training with a signal that utilizes consistencies in space, time, and physical models. The resulting model may take advantage of stereo, temporal signals, and data from differing modalities such as ToF and polarisation imagery. For a specific example, it can be observed that ToF data is often sharp at close range and can provide reliable information in terms of absolute depth distances between a scene surface (i.e., target) and a camera sensor (i.e., datum). Active sensors are relatively accurate in such scenarios, as there is no correspondence matching requirement. In contrast, it has been noted that polarisation data, while also sharp, is not necessarily as accurate in this regard. Nevertheless, using the approach to be described below, polarisation data can provide benefit in terms of correctly identifying surface normal orientation. Using this modality affords information of the polarisation state of diffusely reflected light, which in turn allows establishing correspondences on featureless surfaces enabling stereo-based surface recovery in typically challenging settings. The present learning-based strategy allows to implicitly harness the differing advantages of the modalities (e.g., short range, long range). Learning under multiple modalities offers quality improvements also for single individual modalities.

Learning-based methods are now able to obtain depth estimation via single red-green-blue (RGB) images, however, a large set of existing approaches treat depth prediction as a supervised regression problem and thus require large quantities of corresponding ground-truth data for model training. Obtaining high quality depth data in a range of environments, to serve as ground-truth labels, can be considered prohibitively expensive and is often infeasible. As an alternative to the challenging task of collecting ground-truth depth data, in a range of environments, self-supervised approaches have recently been proposed, negating the requirement for labels per pixel. Self-supervised training signals are then defined using (easier-to-obtain) binocular stereo footage or monocular video and the definition of an appropriate image reconstruction training loss. In this fashion, self-supervised losses can either be constructed using (1) two sensors or (2) a cyclic style reconstruction approach where the original input data may be considered for comparison with a reconstruction thereof.

Figure 3:
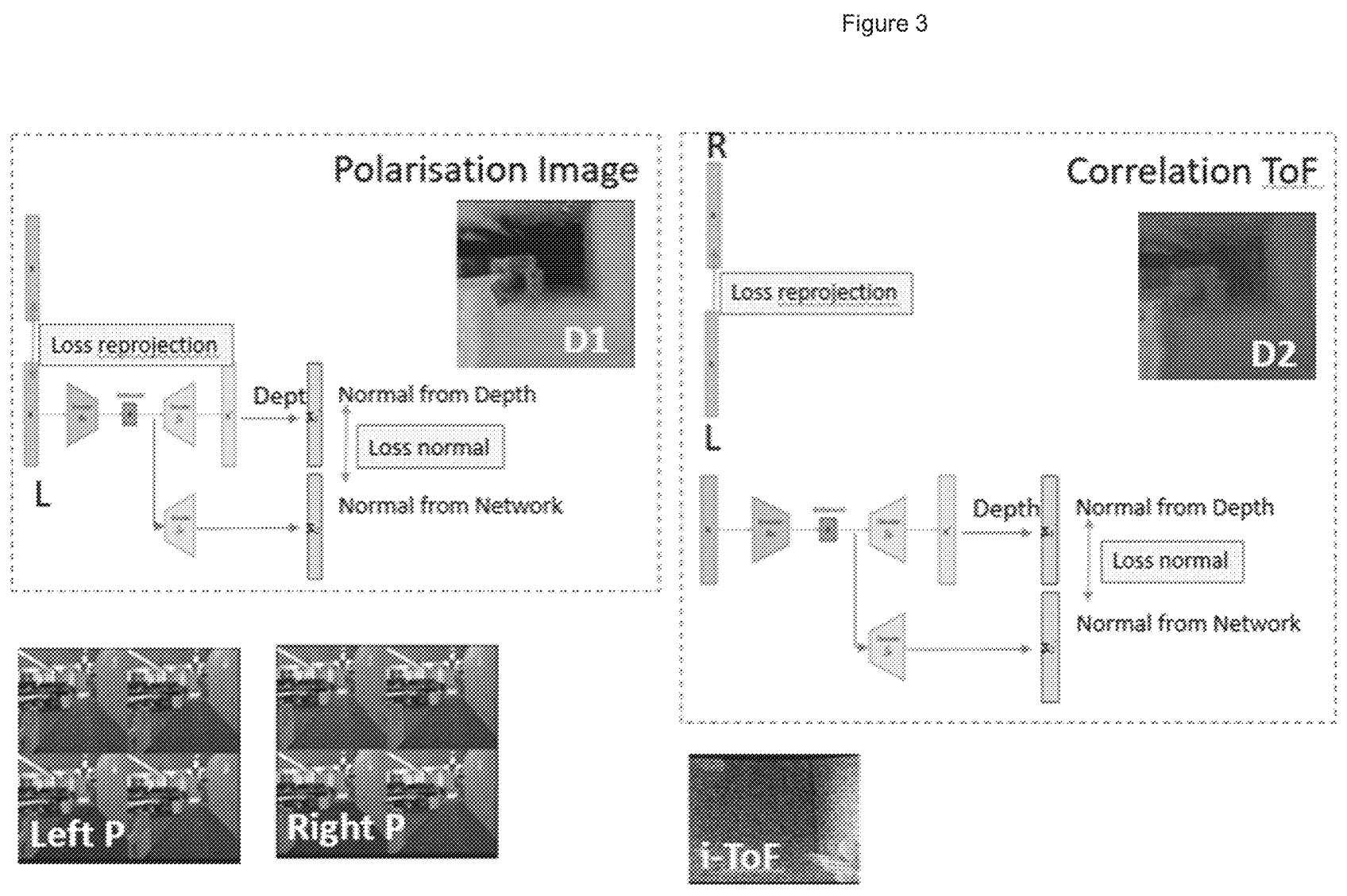
Figure 4:
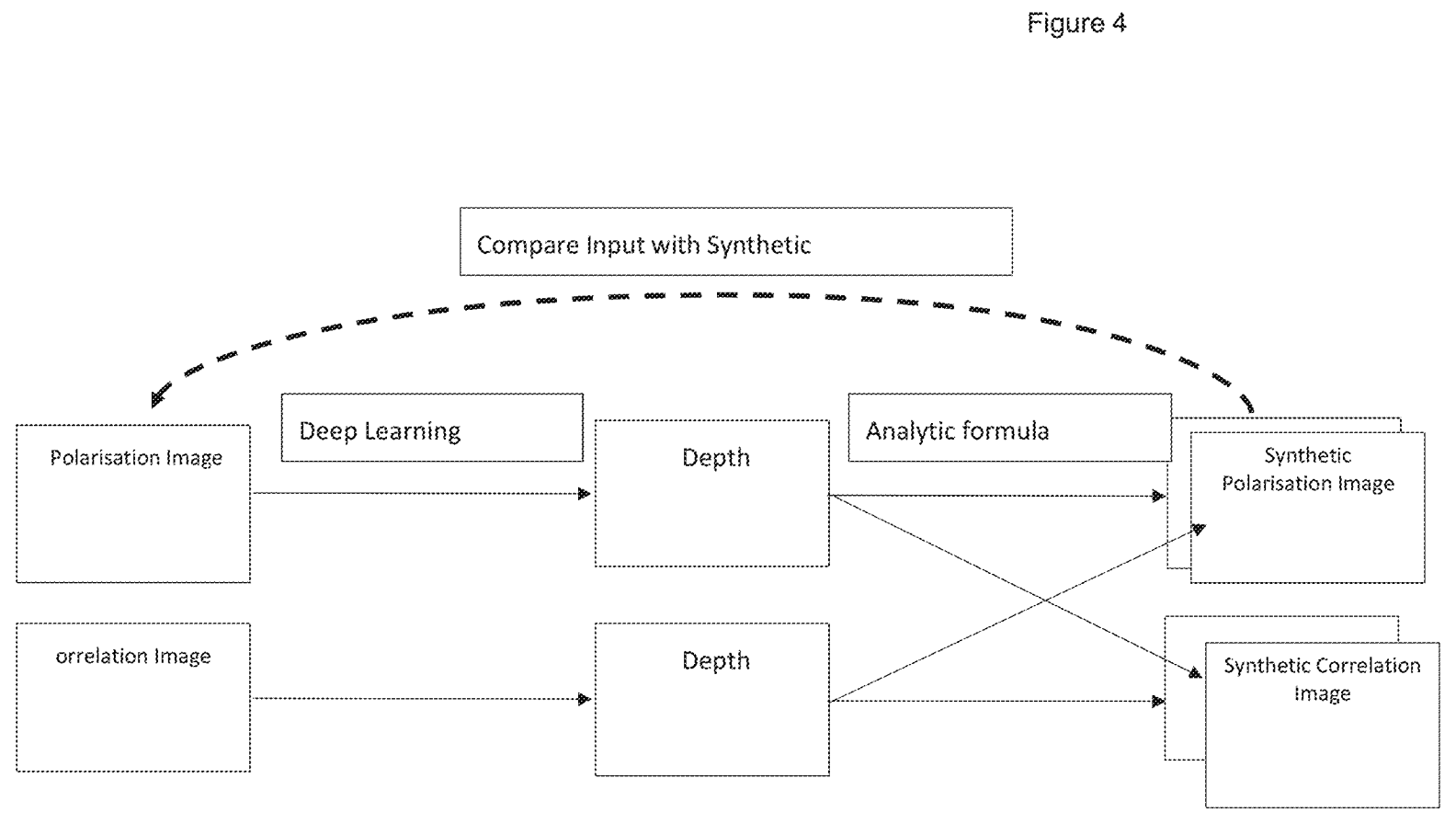

Self-supervision strategies can be extended to multiple image modalities. For each of a set of considered image modalities (e.g. polarisation, ToF) the present model makes use of an autoencoder style architecture with individual decoder network heads for the tasks of depth and surface normal prediction. By using an analytical (e.g., derivative) conversion from predicted depth to surface normal intra-modality-task-head consistency can be enforced. Inter-modality-output-consistency is also ensured by comparing and penalizing a lack of (1) depth prediction agreement (2) surface normal prediction agreement between polarisation and ToF image network outputs. (Self-)supervision is obtained using left, right stereo image pairs with left-right consistency checks between image reprojections. This allows training the models with geometric consistencies, yet without the need for ground-truth labels. The adaptation of self-supervised spatial consistency leverages the second sensor and an adaptation of self-supervised temporal consistency leverages video data. In summary, the intrinsic properties of the modalities (e.g., polarisation, ToF) used in conjunction improve estimation of distance and geometry with formulation of a model of physical consistencies for learning. This allows for defining an identical model learning strategy for each (i.e., both) image modalities. It can be noted that specular and diffuse masks are also determined as a biproduct of the polarisation process. FIG. 3 provides an overview schematic of the present model architecture. FIG. 4 describes how multiple architectures can be combined.

FIG. 3 represents an overview of a model for performing the present processing. The model inputs are either ToF correlation or polarisation images and the outputs are depth and normal maps. The architecture is composed of a traditional 'U-net' (See Ronneberger, O., Fischer, P. and Brox, T., 2015, October. U-net: Convolutional networks for biomedical image segmentation. In International Conference on Medical image computing and computer-assisted intervention (pp. 234-241). Springer, Chain.) with skip connections. The encoder component utilises a 'Resnet' (see He, K., Zhang, X., Ren, S. and Sun, J., 2016. Deep residual learning for image recognition. In *Proceedings of the IEEE conference on computer vision and pattern recognition* (pp. 770-778)) style block while the decoder is a cascade of convolutions with layer resizing. There are two decoders for each encoder. Each decoder outputs a different target; one for the depth image, the other for the normal image. Finally, the depth is analytically transformed (e.g. using a cross product of the image derivatives in x and y directions at each location) in order to form a second normal image. The two normal images are then used during training time to enforce consistency, while the depth is the output (i.e., final product).

FIG. 4 represents how two of these U-Net architectures can be combined together. Using the analytic formulae (e.g. see below), one can form a prediction of the input (either ToF or polarisation) from the predicted depth. These predicted inputs are then compared to the actual input to help guide the network to predict a more accurate depth. So for example, the network taking ToF as an input and returning a depth is guided with a predicted ToF from the predicted depth of ToF as well as a predicted ToF from the predicted depth of polarisation (and vice versa).

Analytic formulae are used to (i) estimate synthetic depth data from measured polarisation data (in the form of one or more images, which may be captured with polarisation filters at appropriate angles) and (ii) estimate synthetic polarisation data from measured depth data. Then the synthetic polarisation data can be compared with the measured polarisation data and the synthetic depth data can be compared with the measured depth data. Multiple regions of the relevant field of view can be identified. For each such region, a selection can be made based on that comparison as to the most internally consistent source of depth data, and the depth as indicated by that source can be treated as the depth for the respective region. Alternatively, another means of fusing the data from the multiple sources may be used, for example by a simple average, by selecting a value most consistent with neighbouring regions or by using other information in the image such as brightness.

A first analytic formula can be used to form synthetic polarisation data from measured or estimated depth data.

Most light sources emit unpolarized light. Light becomes polarized when it is reflected on objects. Polarization cameras capture polarized intensity along various direction $\varphi_{pol}$ such as:

$$i_{\varphi_{pol}} = i_{un}(1 + \rho \cos(2\varphi_{pol} - 2\phi))$$

$$\varphi_{pol} \in \{0, \pi/2, \pi, 2\pi/3\} \tag{1}$$

where $\varphi_{pol}$ represents the angle of polarization, $i_{un}$ is the intensity of unpolarized light, $\rho$ is the degree of linear polarization and $\phi$ is the phase angle.

The polarization parameters $\rho_d$, $\rho_s$ and $\phi$ come either from a diffuse surface (d) or a specular surface(s) as follows:

$$\begin{cases} \rho_s = \dfrac{2\sin^2(\theta)\cos(\theta)\sqrt{\eta^2 - \sin^2(\theta)}}{\eta^2 - \sin^2(\theta) - \eta^2\sin^2(\theta) + 2\sin^4(\theta)} \\[4mm] \rho_d = \dfrac{(\eta - 1/\eta)^2\sin^2(\theta)}{2 + 2\eta^2 - (\eta + 1/\eta)^2\sin^2(\theta) + 4\cos(\theta)\sqrt{\eta^2 - \sin^2(\theta)}} \end{cases} \tag{2}$$

where $$\theta \in \left[0, \frac{\pi}{2}\right]$$

is the viewing angle and $\eta$ the refractive index of the object, and $$\begin{cases} \phi_d = \alpha[\pi] & \text{if the pixel is diffuse} \\[2mm] \phi_s = \alpha + \dfrac{\pi}{2}[\pi] & \text{if the pixel is specular} \end{cases} \tag{3}$$

where $\alpha$ is the azimuth angle of the normal $\vec{n}$. Note that the $\pi$-ambiguity comes from the fact that Equation (1) is unchanged when $\pi$ is added to $\phi$.

Finally, the azimuth angle $\alpha$ and the viewing angle $\theta$ are obtained as:

$$\cos(\theta) = \vec{n} \cdot \vec{v}; \; \tan(\alpha) = \frac{n_y}{n_x} \tag{4}$$

where the viewing vector $\vec{v}$ pointing towards the camera's centre from the considered point are obtained as:

$$v(x, y) = -\begin{bmatrix} \dfrac{(x - c_x)}{f_x}Z \\[3mm] \dfrac{(y - c_y)}{f_y}Z \\[3mm] 1 \end{bmatrix} \text{ and } \vec{n} = \partial_x Z \times \partial_y Z \tag{5}$$

where $c_x$ and $c_y$ are the image centre's coordinates and Z is the estimated depth map.

Indirect Time-of-flight (I-ToF) sensor measure the correlation between a known signal sent and the measured signal received. Using a four-bucket sampling strategy, we can recover the distance from the sensor to an object. The four correlation measurements are modeled as:

$$C_i = I + \frac{A}{2}\cos\left(i\frac{\pi}{2} + \phi_{corr}\right) \text{ with } i \in \{0,1,2,3\} \qquad (6)$$

where A is the amplitude, I the intensity, and $\phi$ the difference of phase between the emitted signal and the received:

$$\phi_{corr} = \left(Z \cdot \frac{c}{4\pi f m}\right)[2\pi]. \qquad (7)$$

Equation 6 gives four images over all values of i.

When comparing the synthetic and measured depth and polarisation data, a selection can be made as to the best of each of the 24 images from the first formula and the best four images from the second formula for consistency.

To train a suitable neural network to implement the present system, training data can be formed with an input format comprising: video-rate I-ToF and stereo polarisation (e.g., synchronized) imaging sources. Towards obtaining such data, a proof-of-concept implementation embodiment was constructed. It includes a hardware camera rig to test the proposed training and inference ideas with real-world (e.g., indoor, outdoor) image data. The hardware rig consisted of polarisation stereo cameras, a time-of-flight (ToF) sensor, and a structured light active sensor. It is capable of capturing 1280×720 depth images (from the active sensor), 2448× 2048 colour polarisation raw image (×2), 4×640×480 8 bit correlation images (ToF). Image capture modalities are synchronized using a hardware trigger such that one master camera triggers the others with its exposure active electric flank. This allows data to be captured at a rate of ten frames per second. Additional manual controls are available for the camera rig to control exposure, gain, focus and aperture settings.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description, it will be evident to a person skilled in the art that various modifications may be made within the scope of the disclosure.

What is claimed is:

1. An image processing apparatus for estimating a depth over a field of view, the apparatus comprising one or more processors configured to:

receive a captured polarisation image representing a polarisation of light received at a first set of multiple locations over the field of view;

process the captured polarisation image using a first trained neural network to form a first estimate of depths at each location in the first set of multiple locations over the field of view;

receive ranging data representing environmental distances from a datum to a second set of multiple locations over the field of view;

process the ranging data using a second trained neural network to form a second estimate of depths to the second set of multiple locations over the field of view;

form a synthetic polarisation image representing estimates of the polarisation of light received at a third set of multiple locations over the field of view by processing one or both of the first and second estimates of depths using a first analytic formulae; and form synthetic ranging data representing estimates of the environmental distances to the third set of multiple locations over the field of view by processing one or both of the first and second estimates of depths using a second analytic formulae.

2. The image processing apparatus as claimed in claim 1, wherein the polarisation image represents the polarisation of light received for multiple locations over the field of view at one or more predetermined polarisations.

3. The image processing apparatus as claimed in claim 1, wherein the image processing apparatus comprises an active sensor apparatus for generating the ranging data and the active sensor apparatus comprises a time-of-flight sensor.

4. The image processing apparatus as claimed in claim 1, the apparatus being configured to generate multiple synthetic polarisation images to be estimated by the first analytic formulae for a plurality of reflectiveness properties.

5. The image processing apparatus as claimed in claim 4, wherein the plurality of reflectiveness properties comprise diffuseness and specularity.

6. The image processing apparatus as claimed in claim 1, the apparatus being configured to generate multiple synthetic polarisation images to be estimated by the first analytic formulae for a plurality of polarisations.

7. The image processing apparatus as claimed in claim 1, the apparatus being configured to generate multiple synthetic polarisation images, the synthetic polarisation images being estimated by the first analytic formulae for a plurality of colours.

8. The image processing apparatus as claimed in claim 4, wherein the apparatus is further configured to compare the polarisation image with the synthetic polarisation image which comprises reducing the multiple synthetic polarisation images to the synthetic polarisation image by selecting, for each location in the field of view for which multiple of the synthetic polarisation images hold estimated polarisation information, the polarisation information having the smallest estimated error.

9. The image processing apparatus as claimed in claim 1, wherein the first analytic formulae are such as to form the estimates of the distances to multiple locations over the field of view in dependence on the intensity of at least one polarisation image at the respective locations.

10. The image processing apparatus as claimed in claim 1, wherein the second analytic formulae are used to generate for each of multiple locations over the field of view, multiple estimates of the distances to the respective location in dependence on respective phase offsets.

11. The image processing apparatus as claimed in claim 1, wherein the image processing apparatus comprises a camera for capturing the captured polarisation image.

12. The image processing apparatus as claimed in claim 1, wherein the captured polarisation image comprises stereoscopic polarisation images.

13. The image processing apparatus as claimed in claim 1, wherein the first and second neural networks are the same.

14. The image processing apparatus as claimed in claim 1, wherein the first analytic formula is used to calculate polarisation estimates in dependence on a trigonometric function of an angle formed from a first sub-angle calculated in dependence on a normal to a corresponding surface and a second sub-angle representing a candidate polarisation angle.

15. The image processing apparatus as claimed in claim 1, wherein the second analytic formula is used to calculate distance estimates in dependence on a trigonometric function of an angle formed from a phase value calculated in dependence on a depth to a corresponding surface.

16. A computer-implemented method for estimating a depth over a field of view, the method comprising:

receiving a captured polarisation image representing a polarisation of light received at a first set of multiple locations over the field of view;

processing the captured polarisation image using a first trained neural network to form a first estimate of depths to the first set of multiple locations over the field of view;

receiving ranging data representing environmental distances from a datum to a second set of multiple locations over the field of view;

processing the ranging data using a second trained neural network to form the second estimate of depths at a second set of multiple locations over the field of view;

forming a synthetic polarisation image representing estimates of the polarisation of light received at a third set of multiple locations over the field of view by processing one or both of the first and second estimates of depths using a first analytic formulae; and forming synthetic ranging data representing estimates of the environmental distances to the third set of multiple locations over the field of view by processing one or both of the first and second estimates of depths using a second analytic formulae.

17. The computer-implemented method as claimed in claim 16, wherein the polarisation image represents the polarisation of light received for multiple locations over the field of view at one or more predetermined polarisations.

18. The computer-implemented method as claimed in claim 16, wherein the image processing apparatus comprises an active sensor apparatus for generating the ranging data and the active sensor apparatus comprises a time-of-flight sensor.

19. The computer-implemented method as claimed in claim 16, the apparatus being configured to form multiple synthetic polarisation images, the synthetic polarisation images being estimated by the first analytic formulae for a plurality of reflectiveness properties.

20. The computer-implemented method as claimed in claim 19, wherein the plurality of reflectiveness properties comprise diffuseness and specularity.

* * * * *